United States Patent
Derouault et al.

(10) Patent No.: US 6,769,895 B2
(45) Date of Patent: Aug. 3, 2004

(54) MACHINE FOR BLOW-MOLDING CONTAINERS, WITH MEANS FOR ORIENTING THE PREFORMS IN THE BLOW MOLD

(75) Inventors: Philippe Derouault, Le Havre Cedex (FR); Jean-Emmanuel Lopes, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 189 days.

(21) Appl. No.: 10/181,019

(22) PCT Filed: Dec. 26, 2000

(86) PCT No.: PCT/FR00/03623

§ 371 (c)(1),
(2), (4) Date: Jul. 30, 2002

(87) PCT Pub. No.: WO01/53063

PCT Pub. Date: Jul. 26, 2001

(65) Prior Publication Data

US 2003/0077349 A1 Apr. 24, 2003

(30) Foreign Application Priority Data

Jan. 20, 2000 (FR) .......................................... 00 00665

(51) Int. Cl.$^7$ .......................... B29C 31/08; B29C 49/06; B29C 49/48; B29C 49/58
(52) U.S. Cl. ...................... 425/145; 425/169; 425/529; 425/534; 425/535; 425/540
(58) Field of Search ................................ 425/145, 169, 425/529, 533, 534, 535, 540, 526, 547

(56) References Cited

U.S. PATENT DOCUMENTS

| | | | | |
|---|---|---|---|---|
| 5,035,603 A | * | 7/1991 | Unterlander et al. | 425/534 |
| 5,282,526 A | * | 2/1994 | Gibbemeyer | 425/534 |
| 5,573,143 A | * | 11/1996 | Deardurff et al. | 222/153.14 |
| 5,660,902 A | | 8/1997 | Unterlander et al. | |
| 5,756,018 A | | 5/1998 | Valyi | |
| 6,669,010 B1 | * | 12/2003 | Venturato et al. | 198/867.09 |
| 2003/0020193 A1 | * | 1/2003 | Hamamoto et al. | 425/534 |

FOREIGN PATENT DOCUMENTS

| | | |
|---|---|---|
| FR | 2 706 876 A | 12/1994 |
| FR | 2 722 134 A | 1/1996 |
| FR | 2 736 299 A | 1/1997 |
| FR | 2 764 544 A | 12/1998 |

* cited by examiner

Primary Examiner—Robert B. Davis
(74) Attorney, Agent, or Firm—Sughrue Mion, PLLC

(57) ABSTRACT

A blow molding machine including at least a blow mold (12), wherein is introduced a preform (14) previously produced by injection molding, and a blow nozzle (22) for injecting pressurized air into the preform (14). It is equipped with a device for orienting the preform in the mold, the device including a grip member (30) adapted to grip the preform (14) by its neck (18) when it is engaged in the mold (12); a device (66) for driving in rotation the grip member (30); a device for detecting (70) at least a reference angular position of the preform (14); and a control device to cause the grip member to rotate until the detecting device detects the reference angular position of the preform.

10 Claims, 5 Drawing Sheets

MACHINE FOR BLOW-MOLDING CONTAINERS, WITH MEANS FOR ORIENTING THE PREFORMS IN THE BLOW MOLD

The invention concerns the field of machines for manufacturing containers from thermoplastic material.

More particularly, the invention concerns blow-molding machines in which containers are manufactured from plastic material, starting with a preform previously obtained, for example, by injection molding.

Such a machine has at least one blow-mold station with a blow mold in which a preform is engaged in such a way that its neck opens to the exterior of the mold. The blow-mold station has a blow pin that is movable between a retracted position and a blow position in which it is sealably held against the mold or against the neck of the preform in order to introduce the blow fluid under pressure into the preform.

Machines of this type are currently used to manufacture polyethylene terephtalate (PET) bottles and jars. In order to achieve good precision in the shape of the bottle, especially in areas of complex shapes, relatively high blow pressures are used. Thus, when the blow fluid is air, the blowing is generally done under a pressure of around 40 bars. This high pressure allows the material of the preform, which has been previously heated, to be forced against the walls that form the impression of the mold. In most machines, a stretch rod is inserted axially into the preform until it comes to rest against the closed end of the bottom of the preform at the same time as the pressurized fluid is injected. In this way the stretch rod makes it possible to better control the axial deformation of the preform during the blow-molding of the container.

In such a method of obtaining a container, the neck of the container is formed directly into its final shape during the injection molding of the preform. This neck generally is threaded to allow the cap to be screwed on to the container.

In some cases, it will be necessary to maintain a particular angular orientation of the preform with respect to the blow mold. Such is the case when neither the body of the container that one wishes to form, nor the cap with which one wishes to close it, is a body of revolution. In this case, it is generally desired that the cap, once it has been completely screwed on to the neck of the container, have a very specific orientation with respect to the body, particularly for aesthetic reasons. In this case, it is the angular arrangement of the threading of the neck with respect to the body of the container that will determine the final position of the cap when it has been screwed on.

Also, it is necessary to provide means for angularly orienting the preform with respect to the blow mold, since it is this mold that gives the body of the container its final shape.

A purpose of the invention, therefore, is to propose means of orienting the preform that are sufficiently precise to ensure a perfect angular orientation of the preform during the machine's entire manufacturing process.

To that end, the invention proposes a machine for blow-molding thermoplastic containers, of the type having at least one blow-molding station having a blow mold in which there is a cavity in the final shape of the container to be produced, of the type in which a preform previously produced by injection molding is engaged in the cavity in such a way that only one open upper end of the preform, its neck, extends outside the mold, of the type in which the blow-molding station has a blow pin that is axially moved against the open end of the preform in order to inject pressurized air therein so as to mold the preform into the final shape of the container, characterized in that the blow-molding station has a device for orienting the preform in the mold, said device being composed of:
a preform gripping device that can grasp the preform by its neck when it is engaged in the cavity of the mold;
a drive device for driving the gripping device in rotation to turn the preform around its axis;
a device for detecting at least one angular position of reference of the preform; and
control means that are suitable for controlling the drive device in order to cause the rotation of the gripping device until the detection device detects the angular position of reference of the preform.

According to other characteristics of the invention:
the control means are suitable for causing a rotation of the gripping device and of the preform by a predetermined offset angle from the angular position of reference;
the gripping device is carried by the blow pin;
the device for detecting the angular position of reference of the preform has an optical detector that can detect a reference mark made on the neck of the preform;
the blow pin has a body that is axially movable between an upper retracted position and a lower working position, and the body can be moved into an intermediate axial position of orientation in which the gripping device grasps the preform in order to be able to orient it angularly;
the blow pin body, when moving from its retracted position to an intermediate position, carries with it the gripping device which moves from a retracted position to a position of gripping and orienting the preform, and when the blow pin body is moved from its intermediate position to its working position, the gripping device remains stationary and is moved relative to the blow pin body by elastic return means;
at its lower end, the blow pin has a bell which, when the blow pin body is in the working position, sealably presses against the upper surface of the mold, around the neck of the preform, and the bell is axially integral with the blow pin body, but movable in rotation around the axis of the blow pin;
the bell and the gripping device are integral in rotation with each other while being axially movable with respect to each other;
the bell has an external toothed wheel by which it is driven in rotation by the drive device;
the machine has several blow-molding stations that are mounted on a rotary carrousel, and each blow-molding station has a preform orientation device.

Other characteristics and advantages of the invention will appear from the following detailed description as well as from the attached drawings in which.

Figure 1:
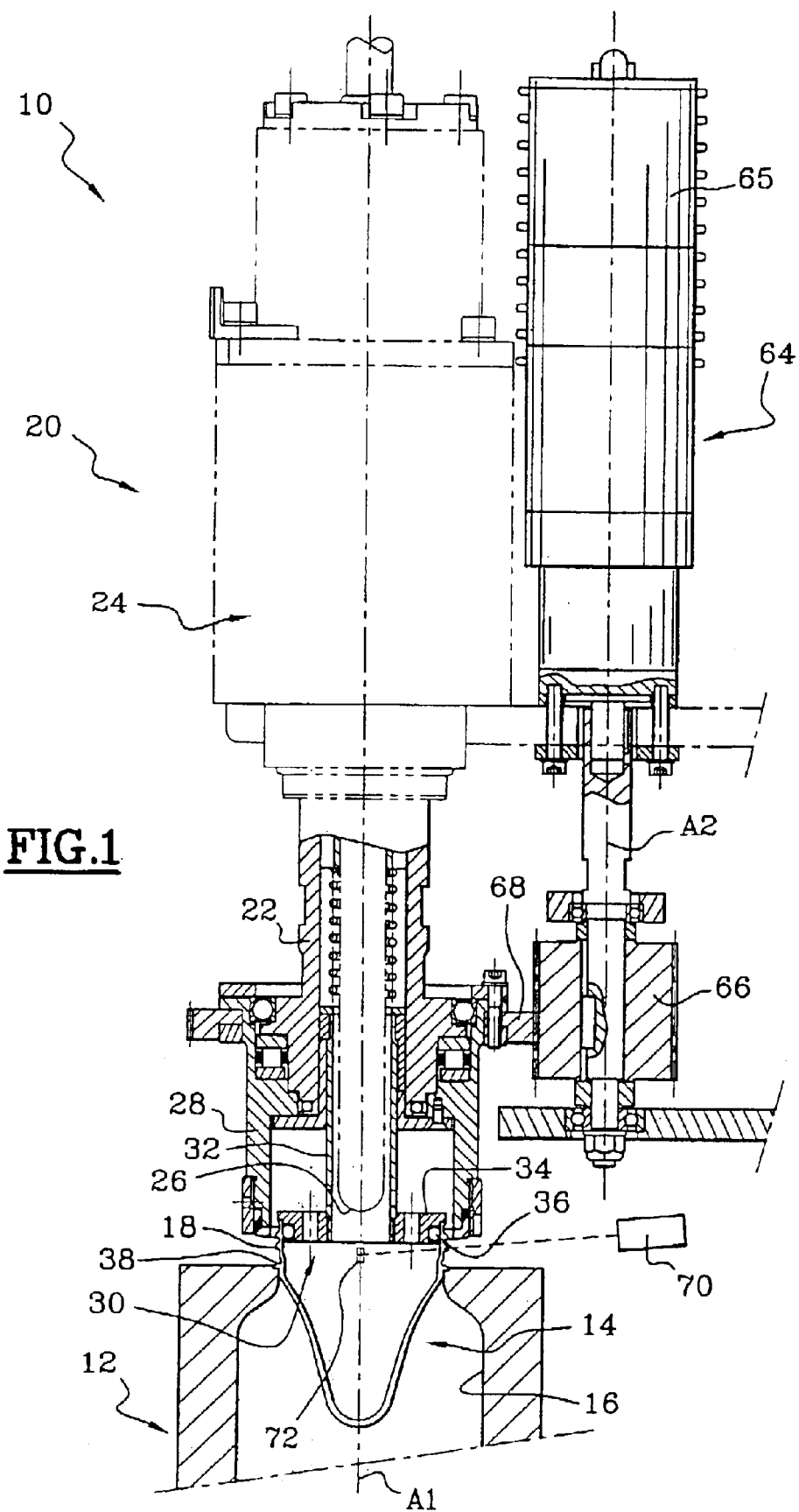
FIG. 1 is a general diagrammatical view in axial cross section of one form of embodiment of a blow-molding station according to the invention.

Illustrated in FIG. 1 is a blow-molding station for a container blow-molding machine. The example illustrated concerns a machine for blow-molding wide-neck containers, also called jars, but the invention can be adapted for other machines, and in particular to bottle manufacturing machines.

The blow-molding station 10 has, in a known way, a blow mold 12 that is generally made in two or three parts that are movable with respect to each other in order to allow a preform 14 to be introduced into the mold cavity 16, formed inside this mold 12, and to allow the container to be removed from the mold after the blowing operation.

The preform 14 is in the form of a hollow body obtained by injection molding and it generally has an axial symmetry of revolution. The preform is thus closed at one axial end, which will arbitrarily be called lower, and open at its upper end. This upper end, which is intended to form the neck 18 of the container, is cylindrical of revolution around an axis A1, and has, for example, external threading. When the preform 14 is engaged in the mold 12, only the neck 18 extends outside the mold 12.

In the illustrated example, the blow-molding station is configured so that the neck 18 of the preform 14 extends above the upper face of the mold 12. The blow-molding station has a blow pin 20 that is placed axially above the mold 12, and which is intended to be moved axially downward against the neck of the preform 14 in order to inject pressurized air thereinto and to force the material of the preform body to be deformed and to take on the shape of the cavity 16 of the mold 12.

It should be noted that the terms "upper," "lower," "up," "down," etc., used in the text refer to the configuration of the blow-molding station as illustrated in the figures. However, the use of these terms should not be considered as a limitation to the scope of the invention, which will also find application with other orientations of the blow-molding station.

According to one of the applicant's known designs of blow-molding machines, the blow pin 20 essentially has a tubular blow pin body 22 that is axially movable in a fixed blow-pin holder 24 of the blow-molding station 10. A stretch rod 26, which is axially controlled by a cylinder or cam (not represented) to insert into the preform 14 and guide the axial deformation thereof during the blow molding, passes through the blow-pin holder 24 and the blow pin body 22 along the axis A1.

In the example illustrated, the blow-molding station is equipped with a bell blow pin comparable to the one described in French patent FR-2,764,544. The blow pin body 22 is fitted at its lower end with a bell-shaped part 28 that is open at its lower end to press sealably on the upper face of the mold 12, around the neck of the preform 14 and not resting thereon. When the bell 28 is pressed against the mold, the blow pin is in sealed communication with the interior of the preform in order to inject pressurized gas thereinto.

Figure 2:
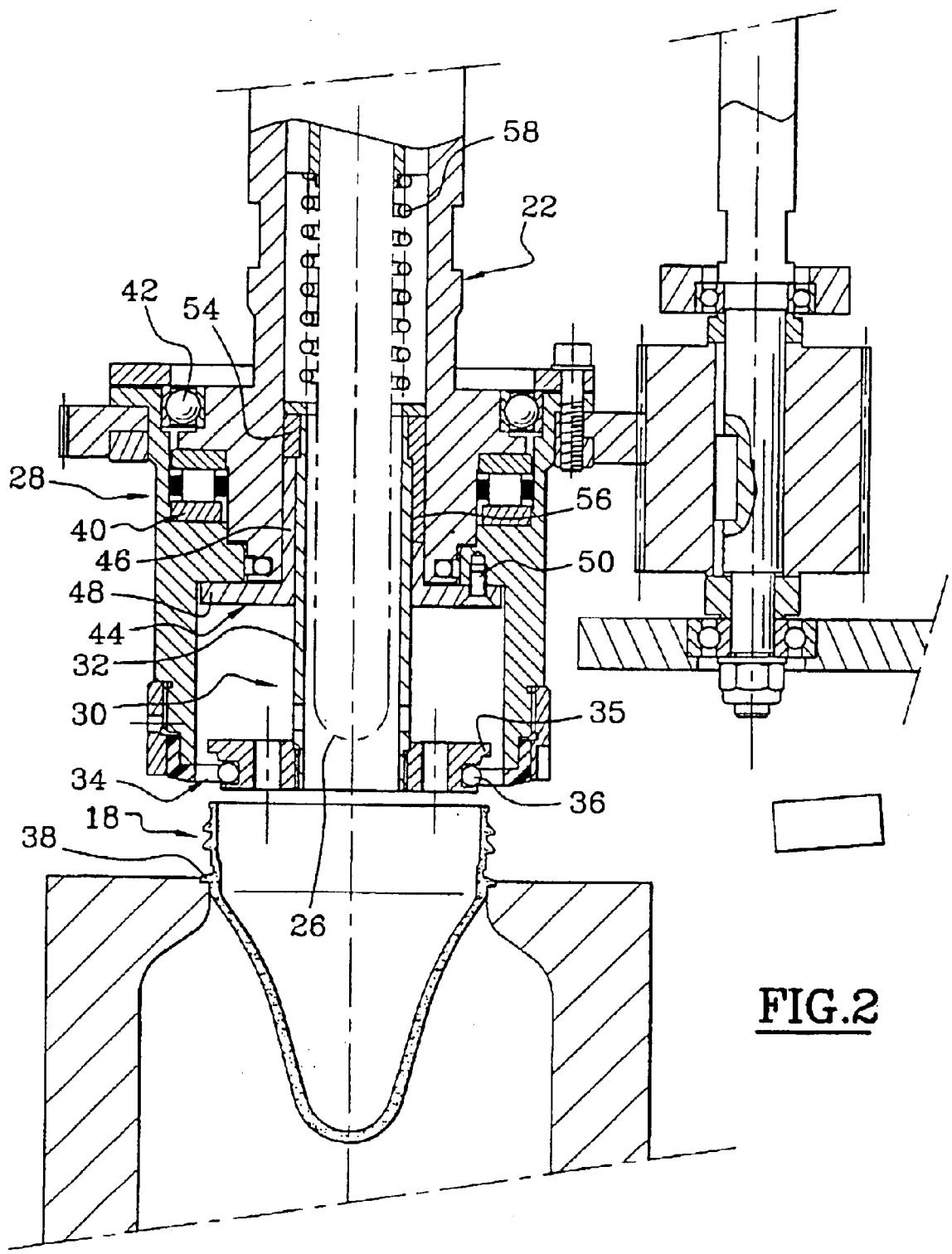
FIGS. 2 to 4 are more detailed views of the blow pin and of the orientation device according to the invention, the blow pin being represented respectively in its three axial positions of retracted up, intermediate orientation, and lower working position.
Figure 4:
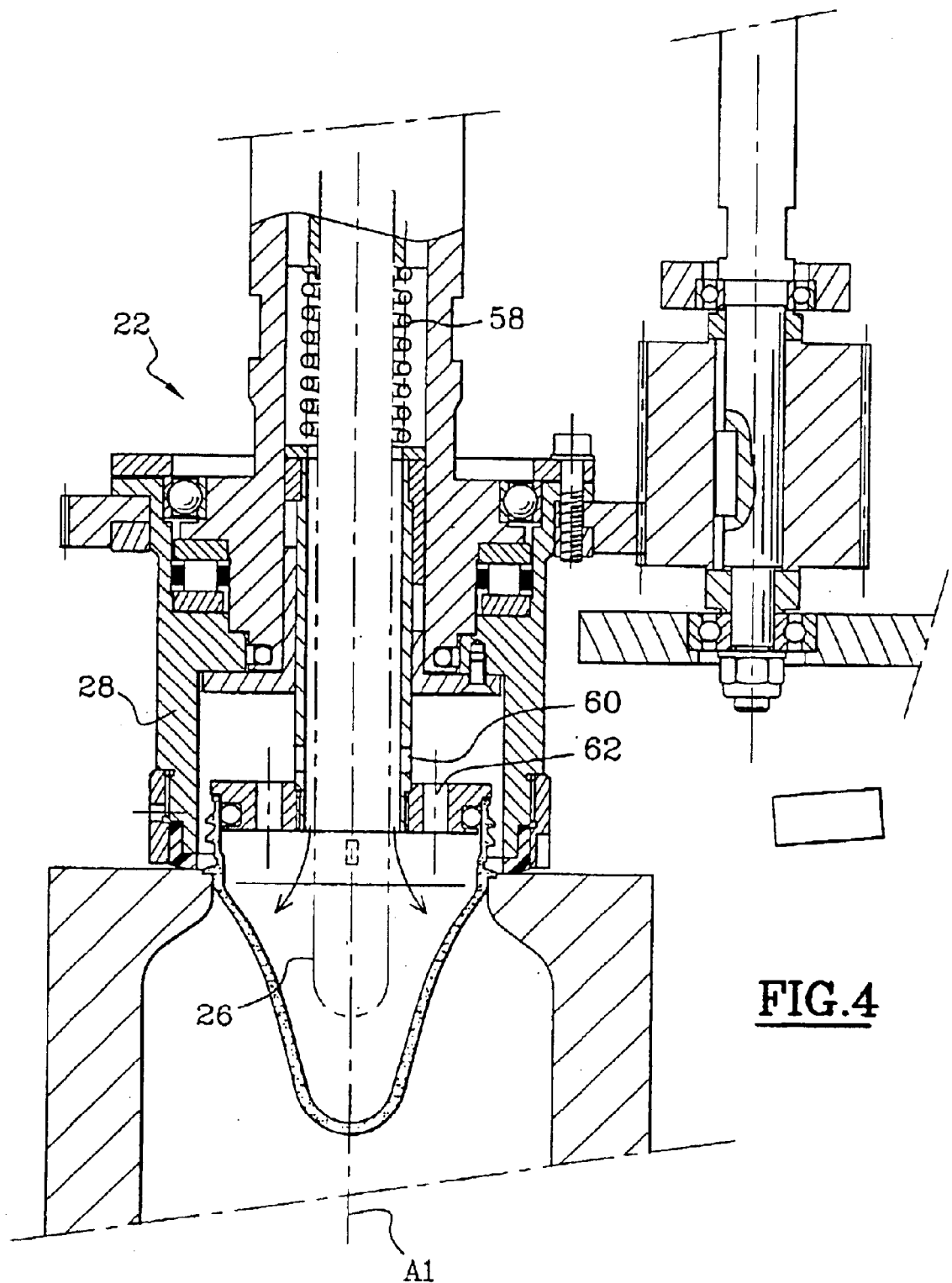

The blow pin body 22, and therefore the bell 28, can be axially positioned in at least three positions. In FIG. 2, the blow pin is in the retracted up position in which it allows the preform to be loaded into the mold 12, as well as the container to be removed after it is formed. In FIG. 4, the blow pin is illustrated in the working position in which the bell 28 is pressed against the mold 12. The movements of the blow pin can be controlled in different ways, particularly through the use of a multistage pneumatic cylinder (not represented). According to the invention, the blow-molding station has means for orienting the preform 14 around the axis A1 after it has been inserted into the mold 12.

Figure 3:
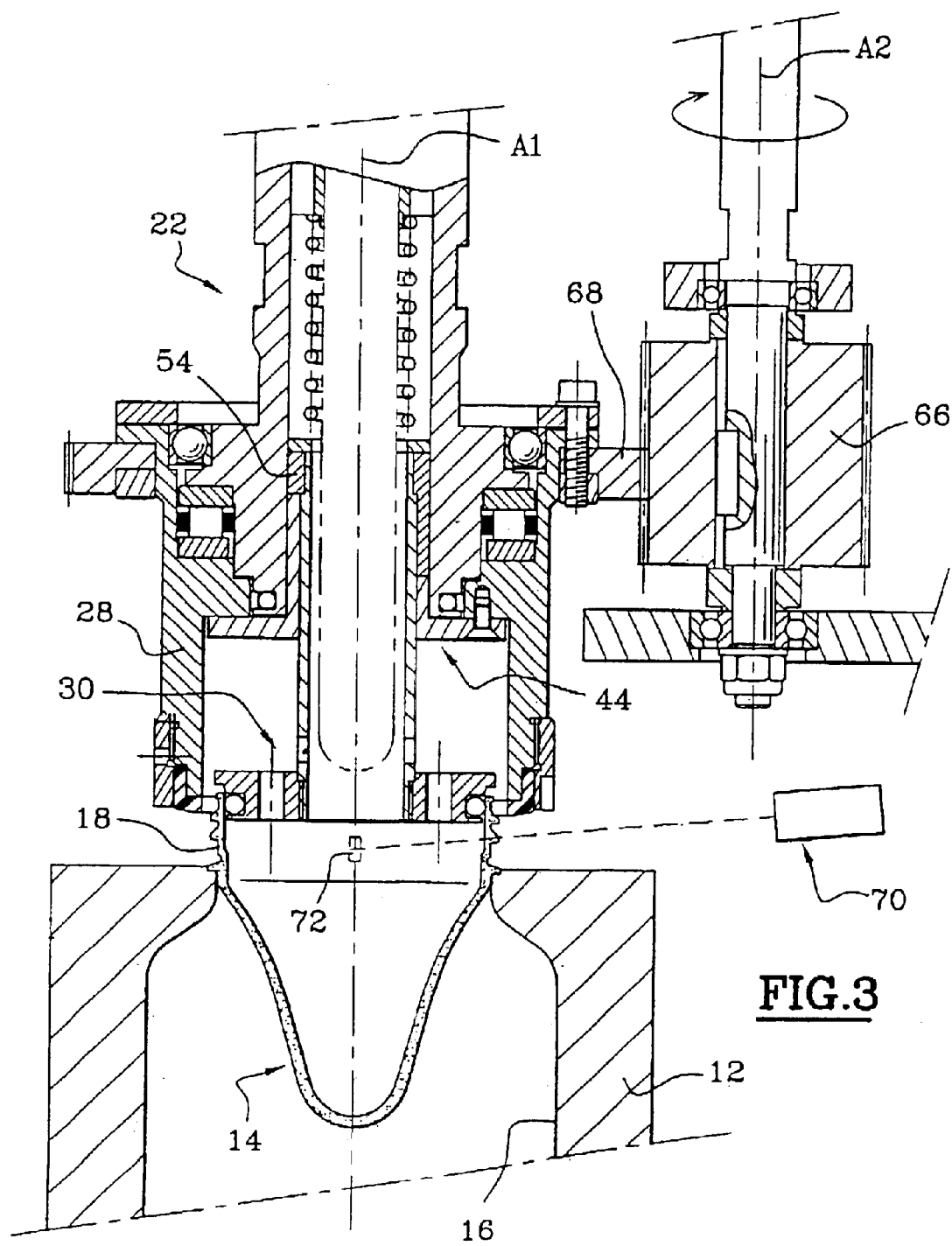

As can be seen, the blow pin is equipped with a gripping device 30 that grasps the preform 14 when the blow pin body is moved axially from its upper position to an intermediate position illustrated in FIG. 3. In the form of embodiment illustrated in the figures, the gripping device 30 is received inside the bell 28 and is designed to grasp the preform 14 by the inside of the neck. However, as a variation, it could be designed to grasp the neck of the preform by the exterior, particularly in the case of performs having a small-diameter neck.

Figure 5:
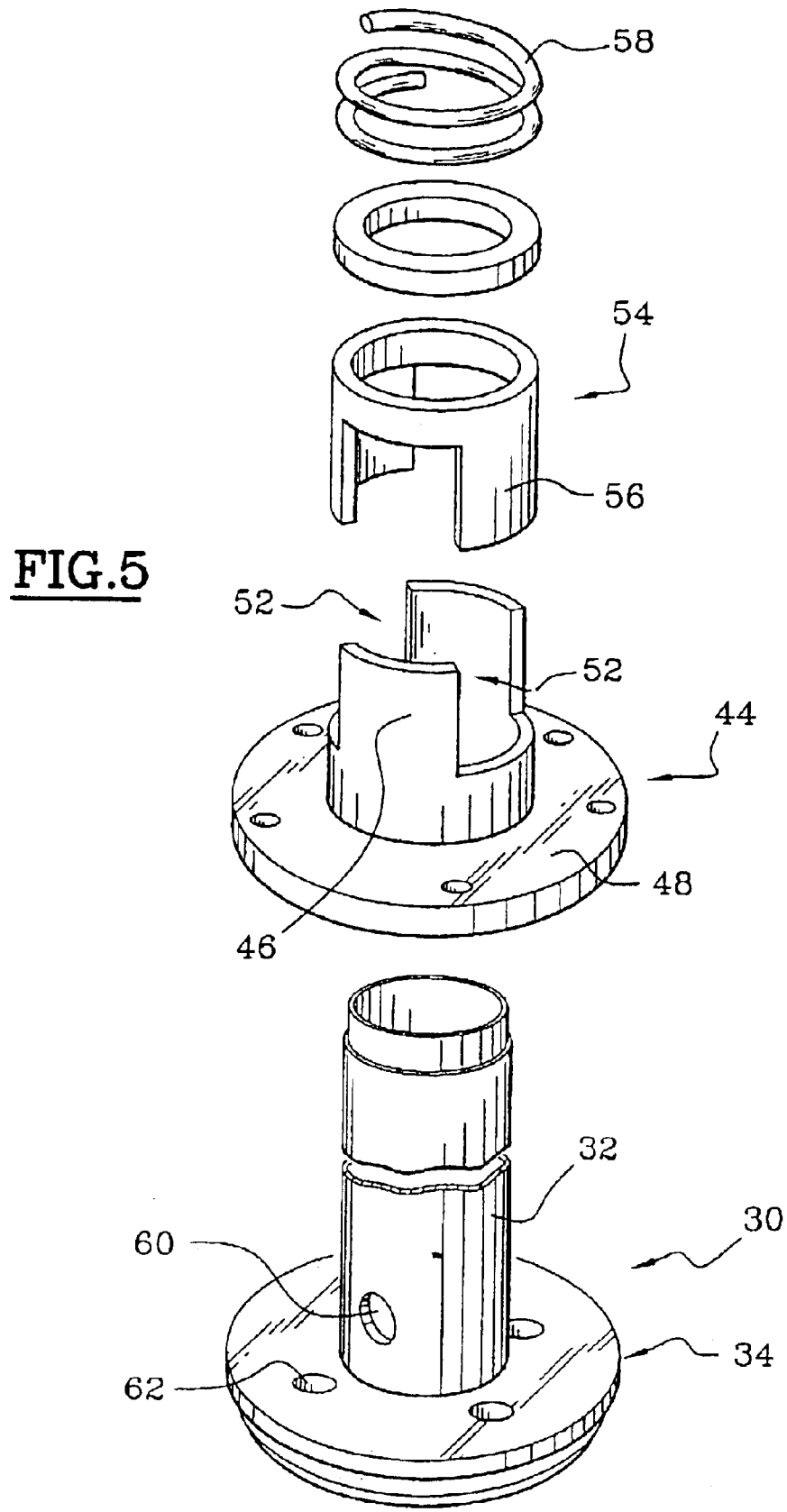
FIG. 5 is an exploded view in perspective illustrating the coupling system between the gripping device and the blow pin bell.

As shown particularly in FIG. 5, the gripping device 30 has an appreciably tubular shaft 32 with axis A1 onto the lower end of which is screwed an annular collar 34, the outside diameter of which corresponds to the inside diameter of the neck of the preform. At its periphery, the collar 34 has an elastic snap ring 36 that holds the preform on the gripping device 30 when the collar 34 is axially engaged in the neck of the preform 14. At the moment of the engagement, the presence of an external radial flange 38 is of assistance. Said flange is at the base of the neck 18 and allows the preform to rest on the upper face of the mold 12. The collar 34 can thus engage in the neck 18, in spite of the effort of engagement due to the presence of the snap ring 36. The figures show that the collar 34 has an upper rim 35 that can press against the upper edge of the neck 18. However, the intermediate position of the blow pin 20 will preferably be adjusted so that, for this position, the rim 35 is not yet pressed against the neck 18 of the preform 14.

According to one aspect of the invention, the gripping device 30 is integral with the bell 28 in rotation around the axis A1, which can turn around this axis with respect to the blow pin body 22 at the lower end of which it is attached. Also, the bell 28 is axially integral with the blow pin body 22 but the gripping device can slide axially with respect to this assembly when it is moved from its intermediate position to its lower working position.

To do this, as can be seen, the bell 28 is mounted on the blow pin body 22 with a roller thrust bearing 40 and a ball bearing 22 [sic] interposed. The roller thrust bearing 42 can absorb the axial efforts that occur when the blow pin body presses the bell 28 against the mold 12. The ball bearing 42 provides precise guidance of the rotation between the bell 28 and the blow pin body 22. In this arrangement, the lower end of the blow pin body 22 is received inside the upper end of the bell 28.

However, to preserve a sufficient guide length, the shaft of the gripping device 30 extends into the lower end of the blow pin body 22. In order for the bell 28 and the gripping device 30 to move in rotation, a connecting part 44 is provided that is integral with the bell 28.

The connecting part 44 has a tubular section 46 that extends axially into the blow pin body 22 and which is therefore radially interposed between said body and the shaft 32 of the gripping device 30. At the lower end of the tubular section 46, just beneath the lower end of the blow pin body 22, the connecting part 44 has an annular mounting flange 48 that extends radially outward and is attached to the bell 28, for example by means of screws 50. The connecting part 44 is thus completely integral with the bell 28, both in axial translational movement as well as in rotation around the axis A1.

As illustrated in FIG. 5, the upper end of the tubular section 46 of the connecting part 44 has two notches 52 in parallel axial edges. The two notches open out into the upper end of the tubular section 46. In a complementary way, the upper end of the shaft 32 of the gripping device 30 has a cap 54, in this instance attached and welded, which has two protrusions 56 that are complementary to those of the notches 52. When the shaft 32 enters the tubular section of the connecting part, the protrusions 56 of the attached cap 54 are engaged in the notches 52 so as to allow a relative axial sliding of the gripping device with respect to the connecting part. However, the cooperation of the protrusions 56 with the notches 52 prevents any relative rotation of these two parts. Thus, in addition to guiding the gripping device 30, the connecting part 44 allows the gripping device 30 to slide axially with respect to the bell 28 while being integral in rotation with said bell.

As illustrated in the figures, the freedom of the gripping device 30 to slide is not total. Indeed, the gripping device is pushed downward by the lower end of a compression spring 58 which extends axially into the blow pin body 22, and the upper end of which presses against the reaction surface of the blow pin body. Thus, the gripping device is pushed downward until the protrusions 54 of the cap 56 come to a stop at the bottom of the notches 52 of the connecting part 44. This resting position of the gripping device 30 is the one illustrated in FIGS. 2 and 3. It will be noted that the effort exerted by the spring 58 on the gripping device 30 should be greater than the axial effort of engagement of the collar 34 in the neck 18 of the preform.

When the blow pin body 22 is moved to its lower working position in which the bell 28 is pressed sealably on the upper face of the mold, the rim 35 of the collar 34 prevents the gripping device 30 from descending any farther because it is resting on the preform, which in turn is resting on the mold. Also, the possibility of relative sliding of the gripping device and the bell is necessary to allow the blow pin to reach its lower position, the spring 58 then being compressed between the gripping device 30, which remains fixed, and the blow pin body 22 which is descending, as illustrated in FIG. 4.

In this working position, it can be seen that the stretch rod 26 can move axially through the gripping device in order to penetrate inside the preform 14, while still leaving enough radial space between the rod 26 and the inner wall of the shaft 32 so that the pressurized air can be injected into the preform. It will also be noted that vent holes 60, 62 are made in the shaft 32 and in the collar 34 of the gripping device 30 in order to make it possible to preserve at all times an equal pressure in the blow pin 22, in the container in the process of formation, and in the space delimited by the bell 28 above the mold, in order to prevent the neck 18 of the preform 14 from becoming subjected to a pressure differential that could deform it. Also, when the blow pin is in the working position, the bell is pressed onto the mold 12 and therefore can not turn around the axis A1, which also blocks any rotation of the gripping device 30. Said device then in turn blocks any rotation of the preform 14, simply as a result of the adherence induced by the axial effort applied by the spring 58, which is compressed.

However, when the blow pin is in its intermediate position illustrated in FIG. 3, it can be driven in rotation by a device 64 of the type illustrated in FIG. 1. This device is essentially composed of an electric motor 65 (as well as its control module) which controls the rotation of a pinion gear 66 with axis A2 parallel to axis A1. The bell 28 has an external toothed wheel 68 that meshes with the pinion gear 66, so that the motor 65 can turn the bell 28, and by turning the bell, turns the gripping device 30. The pinion gear preferably has an axial length such that the pinion gear 66 and the wheel 68 always remain engaged, regardless of the axial position of the bell 28. Indeed, although the connection in rotation is really only essential when the blow pin is in the intermediate axial position of indexing, this arrangement makes it possible to avoid any re-engagement problem.

As can be seen in the figures, the blow-molding station according to the invention also has a device for detecting 70 an angular position of reference of the preform. In the example selected, this is an optical device that can detect a reference mark made on the neck 18 of the preform 14. For example, the device could have a laser beam aimed tangentially at the neck of the preform, and it is then able to detect a reference mark in relief 72 made on the preform.

It would also be possible to optically detect a notch made on the flange 38 or a mark of colored ink. In the same way, an electro-mechanical detection device could be used.

The orientation of the preform as a result of the device according to the invention can be done by carrying out the following steps. The preform 14 is first introduced into the cavity 16 of the mold and the mold is then at least partially closed. The blow pin 22, initially in the upper retracted position, is lowered to its intermediate position so that the gripping device 30 can grasp the preform 14 by the neck 18.

The electric motor 64 causes the rotation of the bell 28, which drives the gripping device 30 by means of the connecting part 44. The latter causes the preform 14 to pivot around its axis A1, the preform not being clamped in the mold 12. When the optical device 70 detects that the reference mark 72 has reached a predetermined position, the system then knows that the preform has reached an angular position of reference with respect to the mold. If a device is used at a high speed of rotation and the inertia of the motor causes the reference position to be passed up during this first approach, the motor could also be controlled in the opposite direction to return to the exact position of reference.

From this position, the motor can be stopped and the preform held in the position of reference, or the bell can be turned to a predetermined offset angle to place the preform in a new angular position that will still be perfectly determined with respect to the position of reference. This possibility of an offset with respect to the position of reference allows great freedom concerning the placement of the reference mark, which can therefore be easily created when the preform is injection molded, while taking into account the geometric constraints of stripping.

Next, the blow pin 22 can be controlled downward to its working position for the blow-molding of the container, and when blow molding is complete, the blow pin 22 can be raised again directly to its retracted upper position so that the container can be removed from the mold.

With this type of blow-molding station, the orientation of the preform with respect to the mold at the moment of the blow-molding can be determined with great precision, in a relatively short time, for example less than 500 ms. Consequently, this type of blow-molding station can be integrated into a high-speed blow-molding machine having several blow-molding stations distributed around a continuously driven rotary carrousel, each station being fitted with its orientation device.

The invention just described is based on a preferred form of embodiment that is illustrated in the figures. This form of embodiment, which uses an optical detector that controls an electric motor, makes it possible to obtain results of good accuracy with respect to the orientation of the preform, and with good repeatability.

However, other variations of embodiment are possible. Thus, the drive device as described can be replaced by equivalent systems. In this way, the electric motor could be replaced by a pneumatic motor, or the device could be made in the form of a rack operated by an electric or pneumatic cylinder and meshing with the toothed wheel of the blow pin. Also, a person skilled in the art could easily define variations of the preform gripping device, without going beyond the scope of the invention.

What is claimed is:

1. Machine for blow-molding thermoplastic containers, of the type having at least one blow-molding station (10) having a blow mold (12) in which there is a cavity (16) in the final shape of the container to be produced, of the type in which a preform (14) previously produced by injection molding is engaged in the cavity (16) in such a way that only one open upper end of the reform, its neck (18), extends outside the mold (12), of the type in which the blow-molding station (10) has a blow pin (20) that is axially moved against the open end (18) of the arm (14) in order to inject pressurized air therein so as to mold the preform into the final shape of the container, characterized in that the blow-molding station (10) has a device for orienting the preform (14) in the mold (12), said device being composed of:

a gripping device (30) that can grasp the preform (14) by its neck (18) when it is engaged in the cavity (16) of the mold (12);

a drive device (64) for riving the gripping device (30) in rotation to turn the preform (14) around its axis (A1);

a device for detecting (70) at least one angular position of reference of the preform (14); and control means that are suitable for controlling the drive device in order to cause the rotation of the gripping device (30) until the detection device detects the angular position of reference of the preform (14).

2. Blow molding machine according to claim 1, characterized in that the control means are suitable for causing a rotation of the gripping device (30) and of the preform (14) by a predetermined offset angle from the angular position of reference.

3. Blow molding machine according to claim 1, characterized in that the gripping device (30) is carried by the blow pin (20).

4. Blow molding machine according to claim 1, characterized in that the device for detecting the angular position of reference of the preform (14) has an optical detector that can detect a reference mark (72) made on the neck (18) of the preform (14).

5. Blow molding machine according to claim 3, characterized in that the blow pin (20) has a body (22) that is axially movable between an upper retracted position and a lower working position, and in that the body (22) can be moved into an intermediate axial position of orientation in which the gripping device (30) grasps the preform (14) in order to be able to orient it angularly.

6. Blow molding machine a ding to claim 5, characterized in that the blow pin body (22), when moving from its retracted position to an intermediate position, carries with it the gripping device (30) which moves from a retracted position to a position of gripping and orienting the preform, and in that, when the blow pin body (22) is moved from its intermediate position to its working position, the gripping device (30) remains stationary and is moved relative to the blow pin body (22) by elastic return means (58).

7. Blow molding machine according to claim 5, characterized in that at its lower end, the blow pin (20) has a belt (28) which, when the blow pin body (22) is in the working position, sealably presses against the upper surface of the mold (12), around the neck (18) of the preform (14), and in that the bell (25) is axially integral with the blow pin body (22), but movable in rotation around the axis (A1) or the blow pin (20).

8. Blow molding machine according to claim 7, characterized in that the bell (28) and the gripping device (30) are integral in rotation with each other while being axially movable with respect to each other.

9. Blow molding machine according to claim 8, characterized in that the bell (28) has an external toothed wheel (68) by which it is driven in rotation by the drive device (64).

10. Blow molding machine according to claim 1, characterized in that it has several blow-molding stations (10) are mounted on a rotary carrousel, and each blow-molding station (10) has a preform orientation device.

* * * * *